United States Patent
Balasubramanian et al.

(10) Patent No.: US 6,647,300 B1
(45) Date of Patent: Nov. 11, 2003

(54) BIDDING PARTNER CACHE FOR AUTONOMOUS COOPERATIVE CONTROL SYSTEM

(75) Inventors: Sivaram Balasubramanian, Mayfield Heights, OH (US); Francisco P. Maturana, Twinsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 633 days.

(21) Appl. No.: 09/627,984

(22) Filed: Jul. 28, 2000

(51) Int. Cl.[7] .............................................. G05B 19/18
(52) U.S. Cl. ......................................... 700/4; 700/100
(58) Field of Search ............................... 700/4, 3, 2, 9, 700/20, 99, 103, 97, 100

(56) References Cited

U.S. PATENT DOCUMENTS

| | | | | |
|---|---|---|---|---|
| 5,093,794 A | * | 3/1992 | Howie et al. | 700/100 |
| 5,845,258 A | * | 12/1998 | Kennedy | 700/100 |
| 5,946,212 A | * | 8/1999 | Bermon et al. | 700/97 |
| 5,953,229 A | * | 9/1999 | Clark et al. | 700/100 |
| 6,091,998 A | * | 7/2000 | Vasko et al. | 700/100 |
| 6,094,955 A | * | 8/2000 | Vasko et al. | 700/100 |
| 6,272,391 B1 | * | 8/2001 | Maturana et al. | 700/103 |
| 6,424,872 B1 | * | 7/2002 | Glanzer et al. | 700/18 |
| 6,427,221 B1 | * | 7/2002 | Maturana et al. | 700/100 |
| 6,430,454 B1 | * | 8/2002 | Vasko et al. | 700/100 |
| 6,459,944 B1 | * | 10/2002 | Maturana et al. | 700/100 |
| 6,580,967 B2 | * | 6/2003 | Jevtic et al. | 700/228 |

* cited by examiner

Primary Examiner—Paul P. Gordon
Assistant Examiner—Edward F. Gain, Jr.
(74) Attorney, Agent, or Firm—Quarles & Brady LLP; Alexander M. Gerasimow; William R. Walbrun

(57) ABSTRACT

A distributed control system employs a number of autonomous cooperative units that intercommunicate with bids and counter bids to allocate the production of a product among them. Bidding closure is obtained in an environment where each autonomous cooperative unit can propagate multi-threaded bidding chains, by attaching a response time value to each propagated bid indicating when a response must be received. Sub-bids from that propagated bid forward a reduced version of this response time value that accounts for the sub-bid processing time. Thus, all bidding is concluded within the response time value. Participants in a successful bidding chain are notified so that in the future they may direct bids toward bidding partners that have historically proven successful as part of a successful bidding chain.

20 Claims, 3 Drawing Sheets

BIDDING PARTNER CACHE FOR AUTONOMOUS COOPERATIVE CONTROL SYSTEM

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates to industrial control systems and the like and in particular to an industrial control system comprised of many distributed controllers dividing job tasks among themselves using "market model" based bids and counter bids.

In a centralized model for industrial control, a single central controller (being a specialized computer) coordinates all aspects of the controlled process. Input signals representing values from sensors on the controlled process are communicated to the central controller which executes a control program to develop output signals which are communicated to actuators on the controlled process.

The centralized model is conceptually simple and requires programming only a single device. Nevertheless, the centralized model has some disadvantages. Control systems using this model are particularly vulnerable to failure of the single central controller. Further, communication of all I/O signals to a central location and executing the control program on a single computer, particularly for large control systems, can place undue burdens on processing resources and communication bandwidth.

In the distributed model for industrial control, the control program is executed by a number of spatially separate controllers intercommunicating only as needed on a common network. By placing these controllers near relevant I/O points, the communication of large amounts of I/O data is diminished. Having multiple control devices can also reduce the susceptibility of the control system to failure of any one device.

One difficulty with distributed control is that of developing the multiple control programs to dividing the control tasks among the various distributed controllers and coordinating their actions. One promising method of both dividing the control task among the controllers and coordinating their actions borrows from a market model of the economy in which many different autonomous individuals organize themselves (through bidding and counter bidding) to produce complex products or services without central control. In such autonomous cooperative systems (ACS), a job description is presented to a large number of autonomous cooperative units (ACUs), which, based on knowledge of their own capabilities and limitations, bid on portions of the job and counter bid in response to requests for bids. Control programs are simply developed and the potential exists for control programs to be quickly changed as new circumstances develop. Examples of this would be if it is desired to produce a new product or if ACUs (and associated equipment) are introduced or removed from the system. A description of some such of autonomous control systems are described in co-pending patents.

For an autonomous cooperative system to produce an optimized outcome, it is desirable that many different of divisions of the job among the ACUs be explored and thus that a large number of bids be collected from many different ACUs. This is done by allowing each ACU to make multiple simultaneous requests for bids from other ACUs. It follows that a single ACUs may receive multiple requests for bids from multiple other ACUs each of which must be considered in a separate "context" and each of which may mature into a different completed bid.

The bidding process for each context requires a large number of bidding messages be transmitted over the network 16. Such messages generally include "bid requests" and replies to bid requests including "bid success", "bid failure" and "counter bid" messages. The numbers of messages increases geometrically with the number of ACUs involved and these messages can easily overtax even high-speed communication networks thus delaying the determination of a control solution. This delay limits the usefulness of an ACS in responding quickly to changing control situations and effectively limits the size of control problems that may be advantageously handled by the ACS.

What is needed is a way to realize a freely scalable ACS system that may rapidly determine an optimized control solution that may be implemented with existing hardware having network bandwidth and processing limitations.

BRIEF SUMMARY OF THE INVENTION

The present invention allows complex, multi-context bids combinations to be freely explored by an ACS while still obtaining bid closure within an acceptable time. This is done by attaching a bid response time to each top-level bid. As sub-bids are propagated, they take this bid response time and subtract an amount related to their processing time, and forward that to other bidding partners. Bidding stops when the bid response time (as successively modified) is insufficient for further sub-bids.

As an adjunct to the goal of allowing bid solution space to be freely explored, the present invention also significantly reduces the number of bid messages needed to provide a solution, and thus requires less network bandwidth and ACU processing power. This is done by reporting to each ACU that was part of a successful bid together with the information about the sub-bidding partner of that ACU. In future bidding situations, the given ACU preferentially bids with those sub-bidding partners that were earlier part of a successful bid.

Specifically then, the present invention provides an apparatus for and method of coordinating a plurality of autonomous control units (ACUs) to control associated equipment. In a first step, a given ACU receives from a prior ACU a description of at least a portion of a job to be bid upon, together with a given bid response time limit after which a bid will not be accepted by the prior ACU. When a primary part of the job portion matches the capabilities of the given ACU, that ACU communicates a secondary part of the job portion not matching the capabilities of the given ACU over a network to at least one subsequent ACU together with a subsequent bid response time less than the given bid response time limit after which a bid will not be accepted by the given ACU. These steps are repeated with the subsequent ACU acting as the given ACU and a new ACU acting as the subsequent ACU.

Thus it is one object of the invention provide a predictable time limit to the bidding process that is compatible with the decentralized nature of the bidding system. The time limit of the bid response time may be passed along with each bid request to close all bids without the intervention of a central controller.

The subsequent bid response time may equal the given bid response time minus the time required by the given ACU to process the second part of the job for further communication over the network.

Thus it is another object of the invention to allow the sub-bidding process to continue to the last possible moment after which sub-bids could not be collected into a completed bid.

When a primary part of the job portion does not match the capabilities of the given ACU, the secondary part is not communicated to the subsequent ACU and a bid failure message is communicated to the prior ACU.

Thus it is another object of the invention to terminate bid message traffic on all chains that will be unsuccessful even if the time limit has not been exceeded.

The given ACU may receive, from at least one prior ACU a first and second description of at least a first and second different job portion with associated first and second given bid response times after which bids will not be accepted by the prior ACU. In this case, the given ACU may identify a primary part of the first and second job portion each matching the capabilities of the given ACU and a secondary part of the first and second job portions not matching the capability of the ACU. The given ACU may then communicate a description of the first and second secondary part of the first and second job portions over the network to at least two subsequent ACUs together with a third and fourth subsequent bid response time limit less than the given first and second bid response times, respectively.

Thus it is another object of the invention to provide a mechanism for bid closure after a predetermined time that is compatible with a multi-context bidding process.

In response to the communicated secondary part of the job portion, the given ACU may receive within the given bid response time at least one reply bid message from a subsequent ACU, the reply bid message being any of:

(i) bid success messages, indicating that the secondary part of the job portion matches the capability of a subsequent ACU, (ii) bid failure messages indicating that the secondary part of the job portion does not match the capability of a subsequent ACU; and (iii) a bid modification message indicating that the secondary part of the job portion might match the capability of a subsequent ACU with some modification of the secondary part of the job description.

When the reply includes at least one bid success message, the given ACU may forward to the prior ACU only the bid success messages. Alternatively, when the reply includes no bid success messages but at least one bid modification message, the given ACU may forward to the prior ACU only the bid modification messages. Finally, when the reply includes no bid success messages and no bid modification messages, but at least one bid failure message, the given ACU may forward to the prior ACU only the bid failure messages.

Thus it is another object of the invention to minimize network traffic by filtering bid response to only the best bid responses at each ACU.

The method may include the step of reporting a bid success from the given ACU to the initial ACU for the primary part of the job. Further the invention may identify at an initial ACU successful ACUs being part of a sequence of ACUs reporting bid successes for the complete job and communicate to each of the successful ACUs the identity of ACUs subsequent to the successful ACU in the sequence. From that point on, the given ACU may communicate preferentially with subsequent ACUs identified as being part of a sequence of ACUs previously reporting bid successes.

Thus it is another object of the invention to direct bids to those other ACUs which will likely respond successfully in a sub-bid and thereby further reduce network traffic.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE INVENTION

Figure 1:
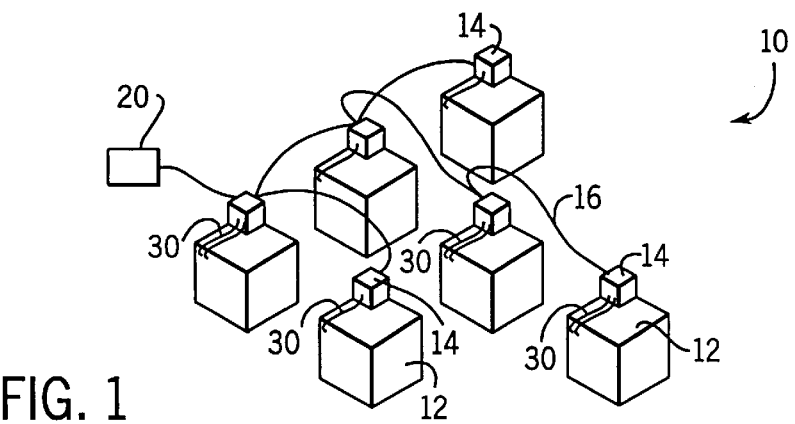
FIG. 1 is a simplified perspective view of a manufacturing process including a number of separate machines intercommunicating via distributed computers connected over a network such as may be used with the present invention.

Referring now to FIG. 1, a distributed industrial control system 10 may include a plurality of machines 12, for example, manufacturing machines such as drills, lathes, ovens, mills and the like, each associated with an electronic computer 14 configured for electrical communication through I/O lines 30 with the machines 12.

The electronic computers 14 may be linked to each other via a network 16 of a type well known in the art allowing for connected messaging or other communication protocol between the various computers 14 whereby each of the computers 14 may produce messages for or consume messages from other computers 14. A human machine interface HMI 20, being a conventional computer terminal or other similar device, may be attached to the network or one of the computers (as shown) allow for programming of the various computers 14 or data entry as will be described.

Figure 2:
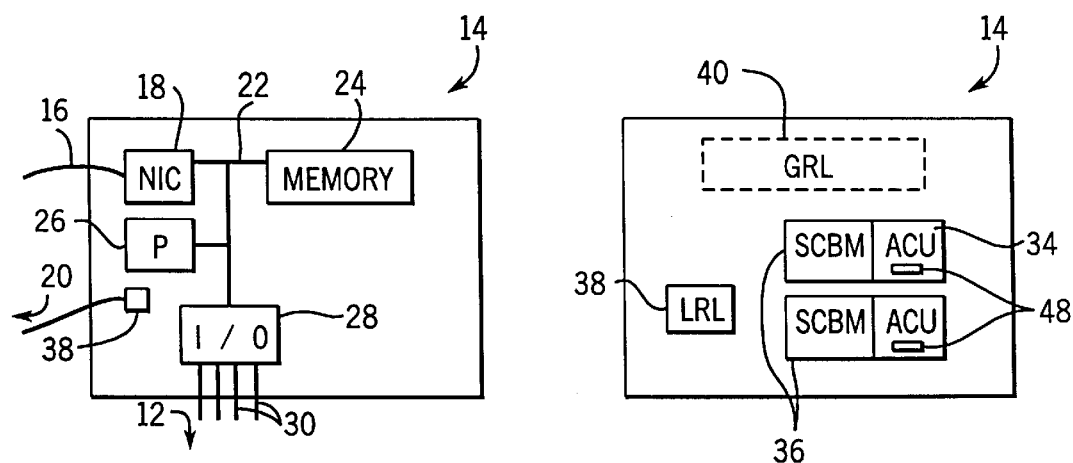
FIG. 2 is a block diagram of one of the computers of FIG. 1 showing a standard architecture for control including a processor, a memory holding data and programs executed by the processor, a network card providing an interface to the network of FIG. 1 and I/O circuits for communicating with the machines of FIG. 1.

Referring now to FIG. 2, each computer 14 includes a network interface 18 of conventional design for transmitting and receiving messages on the network 16 and communicating them to an internal bus 22. The internal bus 22 links the network interface 18 with computer memory 24, a processor 26 and I/O circuits 28, the latter which provide I/O lines 30 leading to sensors or actuators on the machines 12. A secondary communication port 32 may be available for connection to the human machine interface 20 as described above. The memory 24 may hold within it a conventional multitasking operating system, for example, Windows NT (not shown) under which the various programs of the present invention may be simultaneously executed as tasks.

Figure 3:
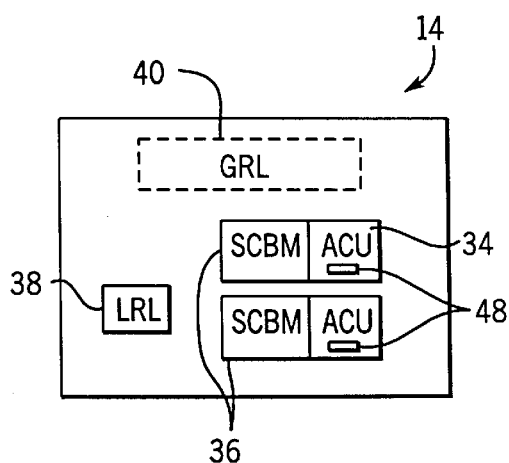
FIG. 3 is a functional diagram of the program and data structures stored in the memory of FIG. 2 including programs implementing autonomous cooperative units, subcontract bid managers associated with each autonomous cooperative unit, a cache-type local resource locator and optionally a global resource locator, the latter which may be implemented in one but not all of the computers.

Referring now to FIG. 3, as is generally understood in the art and as is described in the above referenced patents, under the operating system, in each computer 14, the present invention executes tasks that implement autonomous cooperative units (ACUs) 34 configured for particular machines 12 with which the computer 14 and ACU 34 are associated. As part of its creation, each ACU 34 is programmed, for example, through HMI 20, with data representing the capabilities 48 of the machine 12 with which it is associated. This data indicates both the generic operation or operations performed by the machine 12 (termed: "services") and particular values quantitatively delineating that service (termed: "parameters"). For example, a rolling mill would have a service of "rolling material to reduced thickness" and might have parameters indicating maximum rolling speed, percentage reduction and the like. The particular capabilities 48 will be defined for specific machines 12 according to a standard job description language (JDL).

Each ACU 34 also includes a set of goals indicating a local optimization that the ACU 34 will try to achieve within its parameters, and programs executing protocols for receiving the description of the job (written in JDL) that the ACUs 34 are called upon to complete.

Upon receipt of the job description, each ACU 34 will parse the description, bidding on portions of it matching their capabilities 48 and forwarding other portions in a subcontracting process to other ACUs 34 along with requests for bid messages. Preferably, the ACUs 34 communicate with other ACUs 34 via an agent language such as KQML. ACUs 34 may successfully bid on parts of the job reply with a bid success message upward to the bid requesters and in this way complete bids on the total job may be assembled at the uppermost ACU 34 in the bidding chain. Complete bids, meaning those having one ACU 34 successfully bidding on each part of the job, are compared to select a winning bid describing how the job will be allocated among the ACUs 34.

Through this bidding process, the ACUs 34 mimic the actions of individuals within a market economy to divide up the parts of a job for execution by the various ACUs 34 without need for centralized coordination. When the machines 12 are reconfigured (e.g., configured to different settings, added or removed), the new set of ACUs 34 may quickly reallocate their responsibilities using the same processes.

Referring still to FIG. 3, the present invention adds to the prior art ACUs 34 contained within the computers 14 three additional structures.

The first additional structure is a subcontract bid manager (SCBM) 36. The SCBM 36, which will be described in greater detail below, generally manages requests for bids produced by the ACUs 34. In this way, the operation of the SCBM 36 in steering bids (as will be described) is invisible to the ACUs, simplifying their design. A given computer 14 may contain a number of ACUs 34 each associated with a SCBM 36. The SCBMs 36 may communicate directly with other ACUs 34 in the particular computer 14 or another computer 14 and may also communicate with the local resource locator (LRL) 38 also contained in the computers 14 which serves to direct them to likely ACUs 34 to receive requests for a bid.

The second additional structure is this LRL 38 which is replicated only once for each computer 14 and which provides a cache-like storage area shared by the SCBMs 36 and communicating with the SCBMs 36 on the high speed internal bus 22 as opposed to the slower network 16. Operation of the LRL 38 will also be described in greater detail below.

Figure 11:
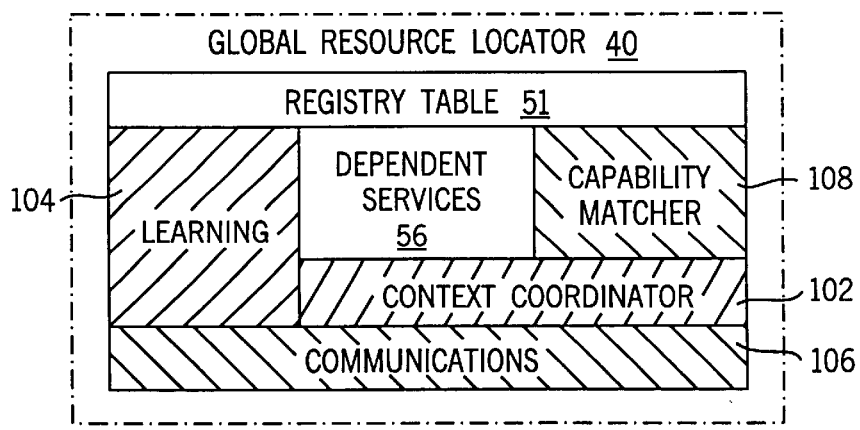
FIG. 11 is a representation of the data structures and functions collected in the global resource locator of FIG. 3.

The third additional structure is a global resource locator (GRL) 40. The GRL 40 is generally implemented in a single of the computers 14 as indicated by the dotted lines however its influence extends among all of the computers 14. As will be described in more detail below, and referring also to FIG. 11, the GRL 40 provides a number of functions including serving as a central clearinghouse for information needed by the ACUs 34 in the bidding process per registry table 51. This information may be selectively downloaded to the LRL 38, based on the operation of a capability matcher 108, to create communication clusters which serves to reduce communications over network 16. The GRL 40 also modifies these clusters according to learning protocols 104, and applies coordination rules (such as implements bid expiration timers) per context coordination protocols 102. The GRL 40 is also an ACU 34 and generally handles inter ACU communication per communication protocols 106.

The following processes are implemented by data and programs implemented in these additional structures with little additional programming of the ACUs 34. Although particular functions will be ascribed to particular ones of these structures of the GRL 40 the LRL 38 and the SCBM 36, it will be understood to one of ordinary skill in the art that the function responsibilities can in some cases be moved from one element to another and that the invention should not be considered to be limited to this functional division except insofar as it is essential to the purposes described herein.

Figure 4:
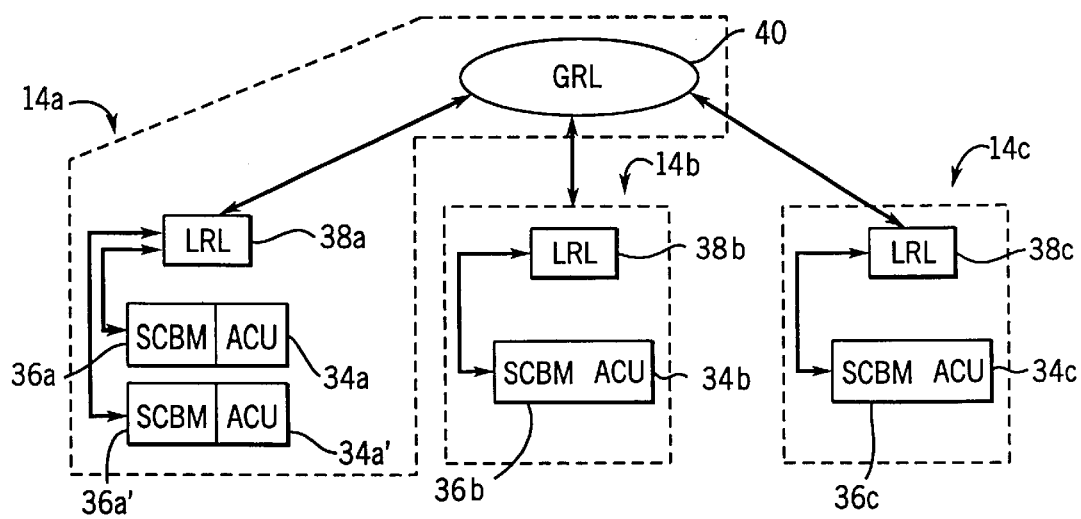
FIG. 4 is a hierarchical diagram showing organization and communications between the programs and data structures of FIG. 3 as implemented in different computers of FIG. 1.

Referring now to FIG. 4, in an example control system 10 having multiple computers 14a–14c, the GRL 40 may be implemented in the first computer 14a to serve in shared capacity with each of computers 14a through 14c. Conversely, each computer 14a to 14c has a separate LRL 38a through 38c and separate ACUs 34a and 34a' (in computer 14a) ACU 34b (in computer 14b) and ACU 34c (in computer 14b). Each ACU 34a, 34a', 34b and 34c are associated with corresponding SCBMs 36a–36c.

Figure 5:
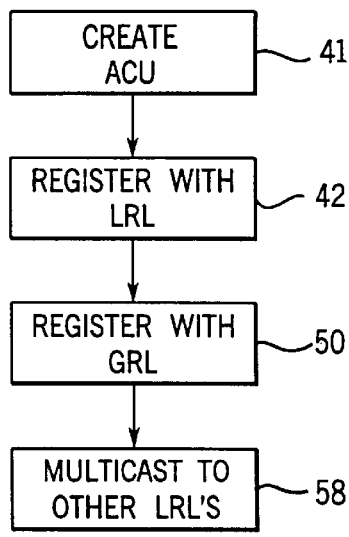
FIG. 5 is a block diagram showing the operation of an autonomous cooperative unit its subcontract bid manager, the local resource locator and global resource locator of FIG. 4 when a new autonomous control unit is initialized such as creates lists of potential bid request receivers in the local resource locator.

Referring now to FIGS. 1, 4 and 5, in initializing the control system 10, the ACUs 34a through 34c are created, for example, through commands and data entered into the HMI 20, according to a prewritten ACU template and the entering of data configuring each ACUs particular services, parameters and goals as indicated by process block 41.

Figure 6:
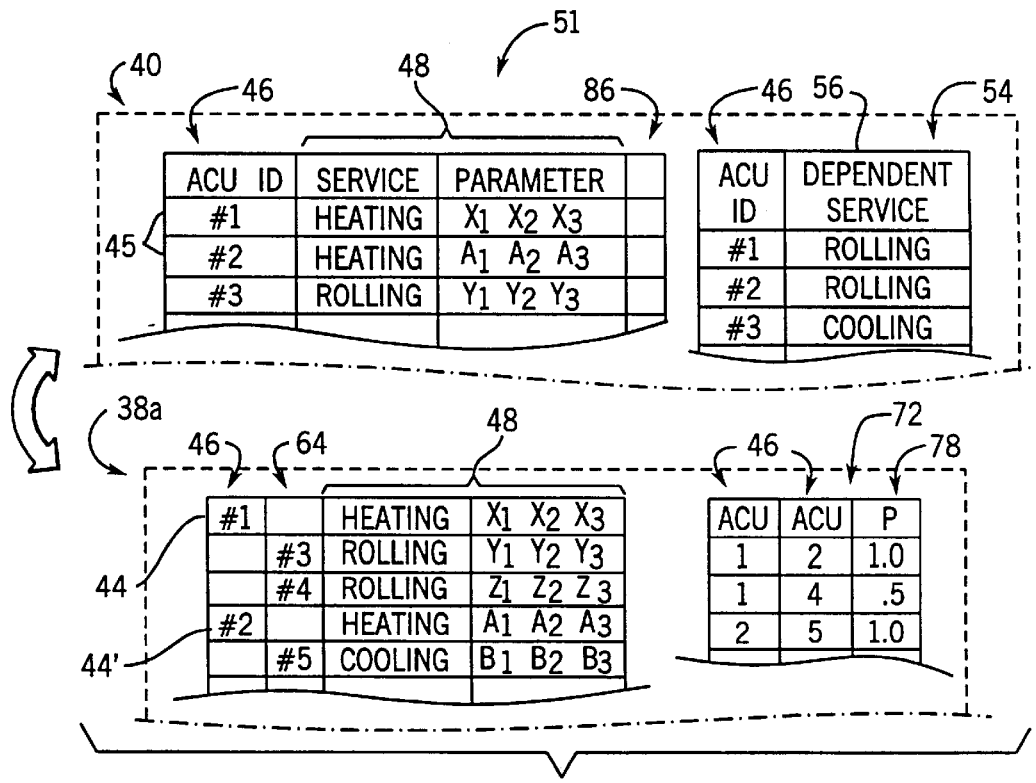
FIG. 6 is an expanded fragmentary representation of data stored in the global resource locator in a registry and relation table, a portion of which as is communicated with and stored in the local resource locator the latter which also holds a success history table.

As indicated by subsequent process block 42, at the time of this initialization, each ACU 34 sends a registration message to the LRL 38 of its computer 14. The message describes the capabilities of the ACU 34 including both its services and parameters. The LRL 38 uses this information to create a row entry 44 in local directory 43 as indicated in FIG. 6. The row entry 44 includes an identification 46 of the ACU 34 in a first column and capabilities 48 of the ACU 34 in a third and fourth column. The identification 46 may simply be the physical address of the ACU 34 on the network allowing ready communication with the particular ACU 34. The second column is reserved for listing related ACUs 34 as will be described and these ACUs 34 may also be identified by their physical address on the network 16.

The LRL 38 acknowledges this message and the ACU 34 waits for an incoming job description language message to begin the bidding process as described above.

Next, as indicated by process block 50, the LRL 38 registers the information provided by the ACU 34 with the GRL 40. Because the LRL 38a in this example is shared with two ACUs 34a and 34a' in computer 14a for this LRL 38a, there will be a second row entry 44' for the second ACU 34. In this example, the ACU 34a is associated with an oven and has as its service, heating and parameters $X_1$, $Y_1$, $X_3$.

In the registration process of process block 50, the LRL 38 sends to the GRL 40 the identification 46 and the capabilities 48 of each row entry 44 and 44'. As noted before, service information indicates generally the type of operation in the manufacturing environment performed by the machine 12 associated with the ACU 34.

The GRL 40 places this material in a registry table 51 as row entries 45. At this time the GRL 40 may create a relation table 54 indicating each registered ACU 34 by its identification 46 and in a second column indicating dependent services 56 likely to be used in conjunction with the capabilities 48 of the particular ACU 34. These dependent services 56 provide an initial means to identify other ACUs 34 that are promising targets for requests for bids. For example, if ACU 34a (having an identification 46 of 1) is a heater, it may logically be followed by a rolling mill as indicated in the relation table 54. Thus, for example, in a job requiring heating, then rolling and cooling of metal strips, ACU 34a would bid on the heating and then need to request bids on the rolling.

Specifically, the relation table 54 may be created by applying known relationships between services (e.g. heating and rolling) and matching the services of the ACUs 34 from the registry to the appropriate corresponding dependent service 56 per the relation table 54. Alternatively, at the time of creation of the ACUs 34 per process block 41, dependent services 56 can be identified. The relation table 54 may hold multiple dependent services 56 for each ACU 34.

Alternative or in addition, the relation table 54 may indicate physical connections between machines 12 such as may further limit relations between ACUs 34 insofar as the machines 12 may need a direct path of communications. In this regard, the dependent services 56 may simply identify specific other ACUs 34 by identification numbers, for example, those having a material transfer path connecting to ACUs in sequential fashion. As will be seen, the initial loading of the relation table may be modified as the process continues and thus is not critical in accuracy.

Referring again to FIG. 5, as shown by process block 58, upon receiving the registrations from a given ACU 34, the GRL 40 consults the relation table 54 and multicasts the identity of the given ACU 34 and its capabilities to the LRLs 38 associated with other ACUs 34 that list dependent services 56 in the relation table 54 matching the capability 48 of the given ACU 34 recorded with the registry table 51. This is under the control of the capability matching protocol 108 shown in FIG. 11. These transmissions may be updated as new ACUs 34 are registered. Generally the LRLs 38 have less storage capacity than the registry and hence the GRL 40 limits the multicast to data on a "cluster" of ACUs 34, the identity of which is stored in a cluster record 86 being part of the registry. Initially the cluster may be randomly chosen. The multicasting and other inter-ACU communications tasks are handled by the GRL 40 using agent communication protocols known in the art and as indicated by block 106 of FIG. 11.

The LRLs 38 receiving this multicast, enter the transmitted data under the appropriate row entries 44 of the ACUs 34. Thus for example, as shown in FIG. 6, when ACU number 3 having a capability 48 including "rolling" is entered into the registry table 51, the GRL 40 scans the relation table 54 and determines that the ACU number 1 may logically send requests to bid to this ACU number 3. The data for ACU number 3 (a potential bid request receiver) is then enrolled in the LRL 38 responsible for ACU number 1 beneath the row entry 44 for ACU number 1. In this way, an individual ACU 34 may consult with the LRL 38 to find likely candidates for receiving bid requests without network traffic.

At the same time that the potential bid request receivers are enrolled in the LRL 38, they are enrolled in success history table 72 also held in the LRL 38. A first column of the success history table 72 holds the identification 46 of an ACU 34 associated with the LRL 38 and a second column holds the identification 46' of the potential bid request receiver downloaded to the LRL 38. A third column shows a priority values 78 indicating likely success in bids between these ACUs based on historical data to be collected. Initially this priority value is set to one however it will vary over time as more historical data is collected as to how likely it is that the indicated ACU will return a successful bid.

At the conclusion of this registration process, each of the ACUs 34a through 34c is registered with the GRL 40 and the associated LRLs 38a through 38c contain a list of potential bid recipients for their ACUs 34.

Figure 7:
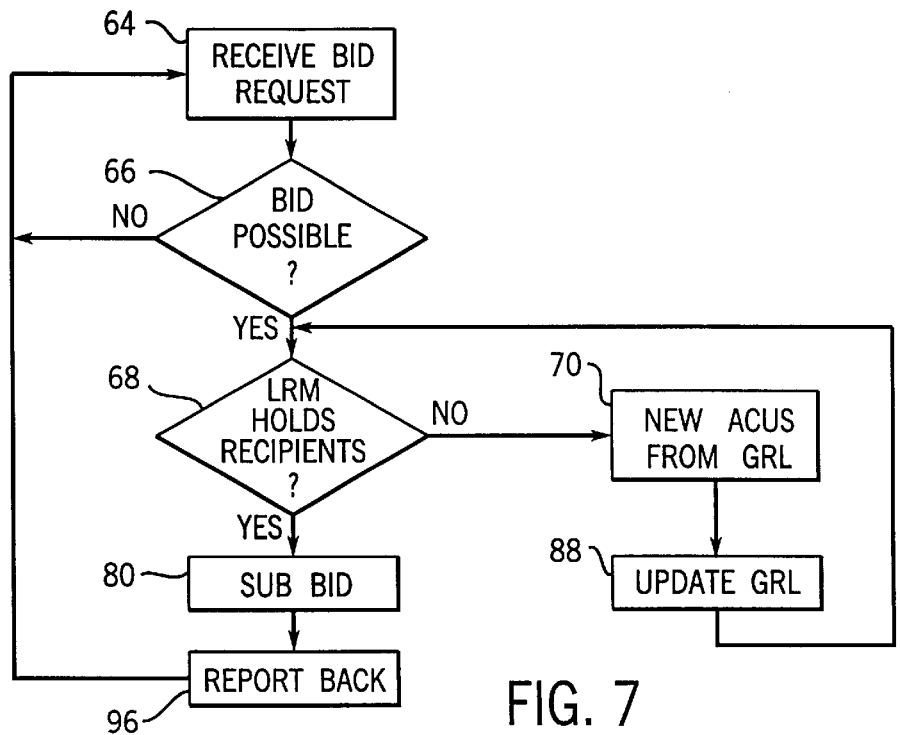
FIG. 7 is a flow chart showing programs of the subcontract bid managers in managing the data of the global resource locator and the local resource locator.

Referring now to FIG. 7, the value of the LRL 38 and the GRL 40 is illustrated as a given ACU 34 receives a bid request associated with a job description or portion of the job description (in JDL) as indicated by process block 64. According to standard operation of the ACU 34, the ACU 34 examines the job description to see if it has parts that match the capabilities of the equipment 12 associated with the ACU 34 as indicated by decision block 66. If the ACU cannot perform a part of the job, the bid is rejected and communicated to the requestor as indicated by arrow 67. On the other hand, if the ACU 34 can perform a part of the job, the ACU 34 consults with its LRL 38 via the SCBM 36 as indicated by decision block 68 to see whether they are potential candidates for sub-bidding.

At process block 64, it should be noted that multiple ACUs may send bid requests to a particular ACU 34 and each is provided with a separate context. Multiple contexts allow a given ACU to act as if the requests for bids were received by separate ACUs with the same address. Referring again to FIG. 6, this process involves reviewing the rows of the LRL 38 beneath the inquiring ACUs row entry 44 to see if there are other ACUs 34 enrolled with the necessary capabilities required by parts of the job description not being performed by the inquiring ACU 34. If no potential bid requesters having suitable capabilities are listed in the LRL 38, the process continues at process block 70 as will be described below.

On the other hand, if potential bid requesters are listed in the LRL 38, then the success history table 72 is consulted to determine whether these candidates have historically provided successful bid responses. The identification 46 of the particular ACU 34 seeking to make a bid request is located in the first column of the success history table 72 and the identification 46 of the potential bid request receiver is located in a second column together to define a row which includes a priority value 78. This priority is compared against a predetermined threshold, for example, 0.5 and if it is greater than that, a bid request receiver is considered successfully found and a request for bid will be forwarded to this identified ACU per process block 94 as will be described below. If however, none of the candidates subcontracting ACUs have sufficiently high priority, the program proceeds again to process block 70. Repeated failure to find successful bid recipients in the success history table 72 may be used to modify the threshold against which priorities are compared.

Failure to find a suitable bid recipient in the LRL 38 is not conclusive, because LRLs 38 tend to be limited by the small size of the computers 14 and far greater information is contained in the registry table 51 of the GRL 40. Accordingly, if no suitable bid request receiving ACU is found, the SCBM 36 communicates with the GRL 40 to obtain a new cluster of related ACUs 34. The GRL 40 may respond in two ways according to the learning protocol 104 (shown in FIG. 11). If the needed bid recipient ACU is of dependent services 56 not listed in the relation table 54 for the requesting ACU 34, the GRL 40 will update the relation table 54 by adding the new dependent service 56 and using this new dependent service 56 will rescan through the registry table 51 to obtain a new cluster of ACUs.

Alternatively, it may be the case that process block 70 is reached when bid request receiving ACUs with the proper dependent capability were found in the LRL 38 but their priority values 78 in the success history table are too low. In this case, the GRL 40 will select a new set of ACUs from the registry table 51 different from those listed in the record 86.

Tracking of previously provided ACUs may be held in the record 86 so that rejected ACUs will not be resubmitted to the LRL 38 until all others have been exhausted.

As the new cluster of ACUs is enrolled in the LRL 38, the success history table 72 is also updated and priority values for these new ACUs are set to one. This indicated by process block 88. The program then proceeds to process block 68 as described above.

Referring still to FIG. 7, if an ACU within the cluster and suitable for receiving a bid is identified at process block 68, then at process block 80, a bid request is submitted to this ACU 34. The results of this bid request are then reported back as indicated by arrow 67. In order to simplify and reduce network transmissions, this transmission reporting back follows the following rules:

At process block 96, if the reply to a bid request (for each context) contain any successes indicating not only that the ACU to which a request for bid was submitted responded favorably, but that it found all necessary subcontracting ACUs to respond favorably, then only successes and the data from those ACUs on responding to the bid are forwarded to the proceeding ACU. If there are multiple successes from different contexts, each success is forwarded. The reporting of counter bids and failures are thus truncated preserving network bandwidth.

If there are no successes, then if any of the bid responses are counter bids, only the counter bids are forwarded. If there are multiple counter bids from different contexts, each counter bid is forwarded.

If there are no successes or counter bids, then only failures are forwarded together with reports as to why the failures occurred.

Figure 8:
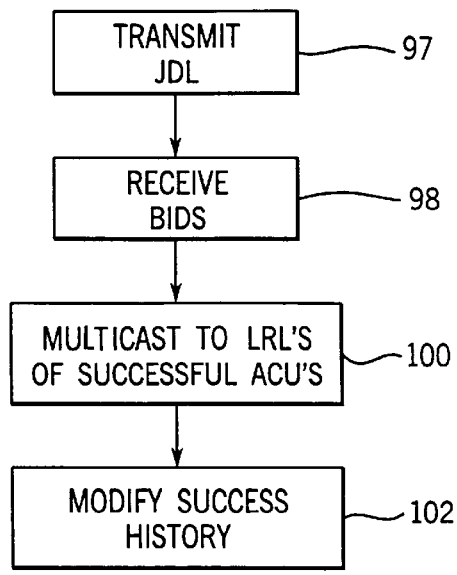
FIG. 8 is a flow chart of the operation of the subcontract manager of FIG. 4 in updating the success history of FIG. 6.

Referring now to FIG. 8, one ACU 34 associated with a product rather than a piece of equipment, may be nominated to submit the original job description with all its parts as indicated by process block 97. This ACU 34 may then receive the bid responses described above as indicated by process block 98. As shown by process block 100 messages indicating successful bids are then multicast to all LRLs 38 of ACUs 34 contributing to the bids. This information is used to modify the success history of the particular LRL in relationship to the corresponding co-contracting ACU. In particular, this involves moving the priorities up for those combinations of ACUs 34 being part of a successful bid (unless they are already at a value of one) and moving priorities down if the particular combination of ACUs 34 was not part of a successful bid. In this way the priorities change over time in a learning process.

Figure 9:
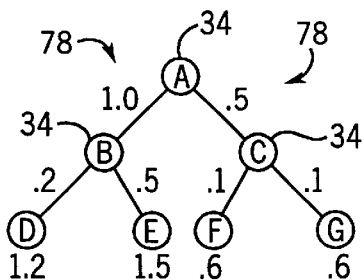
FIG. 9 is a tree structure showing a virtual cluster assembled by operation of the global resource locator and local resource locator providing for success weights from the success history table indicating methods of calculating likely success in bid subcontracting.

Referring now to FIG. 9, it can be seen that for a given ACU A, over time the success history table 72 will assign priority values 78 to its relationship with subcontracting ACUs A B and C. Likewise priorities will be assigned at the LRLs of ACUs B and C for their relationships with ACUs D and E and F and G, respectively. By following the path of highest priorities (implicit in the process described above), quicker conclusions of a bid will be obtained (with fewer bid messages) so long as the bid successes are consistent on a historical basis.

Because of the extremely large solution space and large number of possible chains through ACUs in the bidding process, it is desirable to limit the amount of time before which a response to a request for bid must be received. This prevents lost messages from stalling the process and truncates extremely long searches through possible solution space.

Figure 10:
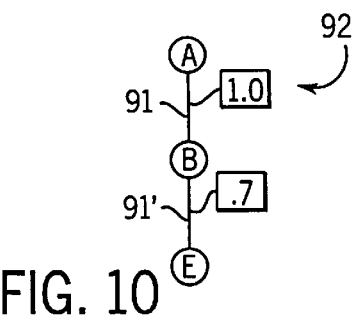
FIG. 10 is a diagram representing the timing constraints on bidding in the present invention.

Referring now to FIG. 10, accordingly each request for bid is attached to a response time value 92. This is done by the global resource locator 40 as it handles communications of messages related to different contexts per the context coordination protocols 102 shown in FIG. 11. As noted above, a request for bid will include the portion of the description that could not be implemented by the current ACU and thus requires further requests for bid from other ACUs. This response time value 92 is propagated in modified form in all subsequent request for bids by those ACUs 34 receiving the initial request for bid. The modification subtracts from the response time value 92 at each level in the bidding process, time necessary for processing the initial request for bid. So for example, and ACU A may transmit a request for bid 91 having a response time value 92 of 1.0 to ACU B. ACU B in turn may make other requests for bids 91' having attached response time values 92 of 0.7, allowing 0.3 of processing time for ACU B to respond. This chain is continued with each subsequent ACU 34 requesting a response time value that is less than the time allotted to it from the previous ACU 34 so that prompt response may be guaranteed. The response time values 92 of FIG. 10 are preserved independently for each context of the ACU.

In this way, it can be assured that ACU B receives its bid responses in sufficient time to forward them to ACU A in the time it requires. Bids received after the response time value 92 are treated as failures.

It is specifically intended that the present invention not be limited to the embodiments and illustrations contained herein, but modified forms of those embodiments including portions of the embodiments and combinations of elements of different embodiments as come within the scope of the following claims.

We claim:

1. A method of coordinating a plurality of autonomous control units (ACUs) to control associated equipment, the ACUs implemented in computers and having capabilities describing operations performable by the equipment associated with the ACUs, the ACUs intercommunicating on an electronic network to divide a predefined job requiring the capabilities among ACUs by a bidding message communicated among ACUs on the electronic network, the method comprising the steps of:

(a) receiving at a given ACU from a prior ACU, a description of at least a portion of the job together with a given bid response time limit after which a bid will not be accepted by the prior ACU;

(b) when a primary part of the job portion matching the capabilities of the given ACU can be identified, communicating a secondary part of the job portion not matching the capabilities of the given ACU over the network to at least one subsequent ACU together with a subsequent bid response time less than the given bid response time limit after which a bid will not be accepted by the given ACU;

(c) repeating steps (a) and (b) with the subsequent ACU acting as the given ACU and a new ACU acting as the subsequent ACU;

whereby chains of bids are truncated at a limiting time.

2. The method of claim 1 wherein the subsequent bid response time equals the given bid response time minus the time required by the given ACU to process the second part of the job for further communication over the network.

3. The method of claim 1, wherein when a primary part of the job portion does not match the capabilities of the given ACU, including the step of not communicating of the secondary part to the subsequent ACU and communicating a bid failure message to the prior ACU.

4. The method of claim 1 wherein the given ACU receives from at least one prior ACU, a first and second description of at least a first and second different job portion with associated first and second given bid response times after which bids will not be accepted by the prior ACU; and wherein the given ACU identifies a primary part of the first and second job portions, each matching the capabilities of the given ACU and a secondary part of the first and second job portions not matching the capability of the ACU; and wherein the given ACU communicates a description of the first and second secondary part of the first and second job portions over the network to at least two subsequent ACUs together with a third and fourth subsequent bid response time limit less than the given first and second bid response times, respectively.

5. The method of claim 1 further including the step of:

subsequent to step (b), in response to the communicated secondary part of the job portion, receiving at the given ACU within the given bid response time, at least one reply bid message from a subsequent ACU, the reply bid message selected from the group consisting of:

(i) bid success messages, indicating that the secondary part of the job portion matches the capability of a subsequent ACU, (ii) bid failure messages indicating that the secondary part of the job portion does not match the capability of a subsequent ACU and (iii) a bid modification message indicating that the secondary part of the job portion might match the capability of a subsequent ACU with some modification of the secondary part of the job description, and further including the steps of:

(1) when the reply includes at least one bid success message, forwarding to the prior ACU only the bid success messages;

(2) when the reply includes no bid success messages but at least one bid modification message, forwarding to the prior ACU only the bid modification messages;

(3) when the reply includes no bid success messages and no bid modification messages, but at least one bid failure message, forwarding to the prior ACU only the bid failure messages.

6. The method of claim 1 wherein step (c) includes the step of reporting a bid success from the given ACU to the initial ACU for the primary part of the job;

and including further the steps of:

(d) identifying at an initial ACU successful ACUs being part of a sequence of ACU reporting bid successes for the complete job;

(e) communicating to each of the successful ACUs the identify of ACUs subsequent to the successful ACU in the sequence;

repeating steps (a)–(e) wherein at a subsequent step (b), the given ACU communicates preferentially with subsequent ACUs identified at an earlier step (e).

7. A method of coordinating a plurality of autonomous control units (ACUs) to control associated equipment, the ACUs implemented in computers and having capabilities describing operations performable by the equipment associated with the ACUs, the ACUs intercommunicating on an electronic network to divide a predefined job requiring the capabilities among ACUs by a bidding message communicated among ACUs on the electronic network, the method comprising the steps of:

(a) communicating from an initial ACU a bid request for a job to multiple given ACUs;

(b) at each given ACU, identifying a primary part of the job matching the capabilities of the given ACU and a secondary part of the job not matching the capability of the given ACU;

(c) reporting a bid success from the given ACU to the initial ACU for the primary part of the job;

(d) communicating from the given ACU to subsequent ACUs additional bid requests related to the secondary part of the job portion;

(e) repeating steps (a)–(c) with the subsequent ACU acting as the given ACU;

(f) identifying at the initial ACU successful ACUs being part of a sequence of ACU reporting bid successes for the complete job;

(e) communicating to each of the successful ACUs the identity of ACUs subsequent to the successful ACU in the sequence;

repeating steps (a)–(e) wherein at a subsequent step (d) the given ACU communicates preferentially with ACU identified at an earlier step (e).

8. The method of claim 7 wherein the successful ACUs assign priority value to other ACUs dependant upon the number of times the other ACU were identified in step (e) and applies a threshold value to the priority values to communicate in step (d) only with ACU whose priority values exceed the threshold value.

9. The method of claim 7 wherein the threshold value is changed for subsequent repetitions of steps (a) through (e) depending on the number of ACU whose priority values exceed the threshold value.

10. The method of claim 7 wherein step (c) of reporting a bid success from the given ACU to the initial ACU for the primary part of the job also passes along reports from subsequent ACU.

11. An industrial controller comprising:

(I) an electrical network for digital communication;

(II) a plurality of autonomous control units (ACUs) implemented in computers and intercommunicating on an electronic network to divide a predefined job among ACUs by a bidding message communicated among ACUs on the electronic network, the ACUs further being in electrical communication with associated equipment and having capabilities describing operations performable by the associated equipment, the ACUs executing a stored program to:

(a) receive at a given ACU from a prior ACU, a description of at least a portion of the job together with a given bid response time limit after which a bid will not be accepted by the prior ACU;

(b) when a primary part of the job portion matching the capabilities of the given ACU can be identified, communicate a secondary part of the job portion not matching the capabilities of the given ACU over the network to at least one subsequent ACU together with a subsequent bid response time less than the given bid response time limit after which a bid will not be accepted by the given ACU;

(c) repeat steps (a) and (b) with the subsequent ACU acting as the given ACU and a new ACU acting as the subsequent ACU;

whereby chains of bids are truncated at a limiting time.

12. The industrial controller of claim 11 wherein the ACUs further execute the stored program so that the subsequent bid response time equals the given bid response time minus the time required by the given ACU to process the second part of the job for further communication over the network.

13. The industrial controller of claim 11, wherein the ACUs further execute the stored program so as, when the primary part of the job portion does not match the capabilities of the given ACU, to including the program step of not communicating of the secondary part to the subsequent ACU and communicating a bid failure message to the prior ACU.

14. The industrial controller of claim 11 wherein the ACUs further execute the stored program so that the given ACU receives from at least one prior ACU, a first and second description of at least a first and second different job portion with associated first and second given bid response times after which bids will not be accepted by the prior ACU; and wherein the given ACU identifies a primary part of the first and second job portions each matching the capabilities of the given ACU and a secondary part of the first and second job portions not matching the capability of the ACU; and wherein the given ACU communicates a description of the first and second secondary part of the first and second job portions over the network to at least two subsequent ACUs together with a third and fourth subsequent bid response time limit less than the given first and second bid response times, respectively.

15. The industrial controller of claim 11 further including the program step of:

subsequent to step (b), in response to the communicated secondary part of the job portion, receiving at the given ACU within the given bid response time, at least one reply bid message from a subsequent ACU, the reply bid message selected from the group consisting of:

(i) bid success messages, indicating that the secondary part of the job portion matches the capability of a subsequent ACU, (ii) bid failure messages indicating that the secondary part of the job portion does not match the capability of a subsequent ACU; and (iii) a bid modification message indicating that the secondary part of the job portion might match the capability of a subsequent ACU with some modification of the secondary part of the job description, and further including the steps of:

(1) when the reply includes at least one bid success message, forwarding to the prior ACU only the bid success messages;

(2) when the reply includes no bid success messages but at least one bid modification message, forwarding to the prior ACU only the bid modification messages;

(3) when the reply includes no bid success messages and no bid modification messages, but at least one bid failure message, forwarding to the prior ACU only the bid failure messages.

16. The industrial controller of claim 11 wherein the ACUs further execute the stored program so that:

program step (c) includes the step of reporting a bid success from the given ACU to the initial ACU for the primary part of the job;

and including further the program steps of:

(d) identifying at an initial ACU successful ACUs being part of a sequence of ACU reporting bid successes for the complete job;

(e) communicating to each of the successful ACUs the identity of ACUs subsequent to the successful ACU in the sequence;

repeating program steps (a)–(e) wherein at a subsequent program step (b) the given ACU communicates preferentially with subsequent ACUs identified at an earlier step (e).

17. An industrial controller comprising:

(I) an electrical network for digital communication;

(II) a plurality of autonomous control units (ACUs) implemented in computers and intercommunicating on an electronic network to divide a predefined job among ACUs by a bidding message communicated among ACUs on the electronic network, the ACUs further being in electrical communication with associated equipment and having capabilities describing operations performable by the associated equipment, the ACUs executing a stored program to:

(a) communicate from an initial ACU a bid request for a job to multiple given ACUs;

(b) at each given ACU, identify a primary part of the job matching the capabilities of the given ACU and a secondary part of the job not matching the capability of the given ACU;

(c) report a bid success from the given ACU to the initial ACU for the primary part of the job;

(d) communicate from the given ACU to subsequent ACUs additional bid requests related to the secondary part of the job portion;

(e) repeat steps (a)–(c) with the subsequent ACU acting as the given ACU;

(f) identify at the initial ACU successful ACUs being part of a sequence of ACU reporting bid successes for the complete job;

(e) communicate to each of the successful ACUs the identity of ACUs subsequent to the successful ACU in the sequence;

repeat steps (a)–(e) wherein at a subsequent step (d) the given ACU communicates preferentially with ACU identified at an earlier step (e).

18. The industrial controller of claim 17 wherein the ACUs further execute the stored program so that the successful ACUs assigns priority value to other ACUs dependant upon the number of times the other ACUs were identified in program step (e) and applies a threshold value to the priority values to communicate in program step (d) only with ACU whose priority values exceed the threshold value.

19. The industrial controller of claim 17 wherein the ACUs further execute the stored program so that the threshold value is changed for subsequent repetitions of program steps (a) through (e) depending on the number of ACU whose priority values exceed the threshold value.

20. The industrial controller of claim 17 wherein program step (c) of reporting a bid success from the given ACU to the initial ACU for the primary part of the job also passes along reports from subsequent ACU.

* * * * *